(12) United States Patent
Muniz

(10) Patent No.: US 8,915,429 B2
(45) Date of Patent: Dec. 23, 2014

(54) METHODS OF MOBILE SELF-CHECKOUT SHOPPING FOR PRODUCE ITEMS IN A RETAIL GROCERY STORE

(71) Applicant: NCR Corporation, Duluth, GA (US)

(72) Inventor: Javier Artime Muniz, Gozón (ES)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/839,180

(22) Filed: Mar. 15, 2013

(65) Prior Publication Data

US 2014/0263631 A1    Sep. 18, 2014

(51) Int. Cl.
*G06K 15/00*    (2006.01)
*G01G 19/40*    (2006.01)

(52) U.S. Cl.
CPC ...................................... *G01G 19/40* (2013.01)
USPC ......................................... 235/383; 235/385

(58) Field of Classification Search
USPC .............. 235/375, 383, 385, 462.01, 462.45, 235/472.01
See application file for complete search history.

(56) References Cited

U.S. PATENT DOCUMENTS

| | | | |
|---|---|---|---|
| 5,821,513 A * | 10/1998 | O'Hagan et al. ............... | 235/383 |
| 5,853,244 A * | 12/1998 | Hoff et al. ...................... | 366/141 |
| 6,084,528 A * | 7/2000 | Beach et al. ................... | 340/5.9 |
| 7,195,157 B2 * | 3/2007 | Swartz et al. .................. | 235/383 |
| 2003/0121974 A1 * | 7/2003 | Blanford et al. ............... | 235/383 |
| 2008/0000967 A1 * | 1/2008 | Do et al. ........................ | 235/383 |
| 2008/0011836 A1 * | 1/2008 | Adema et al. ................. | 235/383 |
| 2008/0308630 A1 * | 12/2008 | Bhogal et al. ................. | 235/383 |
| 2012/0000978 A1 * | 1/2012 | Rollyson et al. .............. | 235/383 |
| 2012/0284132 A1 * | 11/2012 | Kim et al. ....................... | 705/20 |
| 2012/0296751 A1 * | 11/2012 | Napper ........................... | 705/23 |
| 2014/0089006 A1 * | 3/2014 | Abreu ............................... | 705/3 |
| 2014/0136415 A1 * | 5/2014 | Ramachandran et al. ...... | 705/44 |

* cited by examiner

*Primary Examiner* — Tuyen K Vo
(74) *Attorney, Agent, or Firm* — Michael Chan; Paul W. Martin

(57) ABSTRACT

A method is provided of operating a produce weighing scale having a weighing platform. The method comprises prompting a customer to scan a barcode containing barcode data which identifies the produce weighing scale, receiving the barcode data which identifies the produce weighing scale, and after the barcode data has been received, prompting the customer to place produce items one-by-one onto the weighing platform of the produce weighing scale. Another method is provided of operating a mobile device of a customer shopping for produce items in aisles of a produce section of a retail grocery store. Still another method is provided of operating a self-checkout station to enable a customer in a retail grocery store to check out grocery items including produce items.

7 Claims, 5 Drawing Sheets

METHODS OF MOBILE SELF-CHECKOUT SHOPPING FOR PRODUCE ITEMS IN A RETAIL GROCERY STORE

BACKGROUND

The present application relates to self-checkout shopping in retail grocery stores, and is particularly directed to methods of mobile self-checkout shopping for produce items in a retail grocery store.

A typical produce weighing scale in a retail grocery store is located in the produce section of the retail grocery store, and is intended for use by either a retail store clerk or a retail customer. In the former case, a retail store clerk weighs a produce item which is desired to be purchased by a retail customer, waits for a barcode chit to print, and then adhesively attaches the printed barcode chit to a bag or wrap which contains the produce item. In the latter case, a retail customer weighs a produce item, selects and enters at the produce weighing scale the type of produce item from a long list of produce items, waits for a barcode chit to print, and then adhesively attaches the printed barcode chit to a bag or wrap which contains the produce item. When the customer is ready to checkout, the customer takes the bag or wrap to a self-checkout station and scans the printed barcode chit. A drawback in this case of either a retail store clerk or a customer weighing the produce item at the produce weighing scale is that a barcode chit needs to be printed and then adhesively attached to the bag or wrap which contains the produce item.

In some retail grocery stores, a produce weighing scale is located at the self-checkout station. When the customer checks out at the self-checkout station, the customer weighs the produce item to be purchased, and then selects the type of produce item from a long list of produce items. A drawback in this case is that the customer needs to handle produce items in a way which is different (i.e., the selecting of the type of produce item from the long list) from the way in which non-produce items are handled. Another drawback is that the customer does not know the price of the produce item until the customer checks out at the self-checkout station.

In some other retail stores, a customer may use a portable barcode gun to self scan items including produce items to be purchased. The customer can self scan items either before the customer arrives at the self-checkout station or at the time when the customer arrives at the self-checkout station. In the former case, a retail store clerk weighs the produce item on a produce weighing scale located in the produce section of the retail grocery store. In the latter case, the customer weighs the produce item on a produce weighing scale located at the self-checkout station. In either of these two cases, the same drawbacks just described hereinabove are present. It would be desirable to provide improved methods of self-checkout shopping for produce items so that barcode chits need not have to be printed for produce items and so that the customer need not have to handle produce items in a different way from non-produce items.

SUMMARY

In accordance with one embodiment, a method is provided of operating a produce weighing scale having a weighing platform. The method comprises prompting a customer to scan a barcode containing barcode data which identifies the produce weighing scale, receiving the barcode data which identifies the produce weighing scale, and after the barcode data has been received, prompting the customer to place produce items one-by-one onto the weighing platform of the produce weighing scale.

In accordance with another embodiment, a method is provided of operating a mobile device of a customer shopping for produce items in aisles of a produce section of a retail grocery store. The method comprises prompting the customer to scan a barcode associated with a produce item desired to be purchased by the customer, receiving the barcode of the produce item has been scanned by the customer, and adding the produce item associated with the scanned barcode to an electronic shopping cart while the customer is shopping for produce items in the aisles of the produce section of the retail grocery store.

In accordance with yet another embodiment, a method is provided of operating a self-checkout station to enable a customer in a retail grocery store to check out grocery items including produce items. The method comprises receiving an end of transaction signal when the customer is ready to check out the grocery items including produce items at the self-checkout station, and receiving mobile shopping information from an electronic shopping cart, wherein the mobile shopping information comprises weights and prices associated with produce items.

DETAILED DESCRIPTION

The present application relates to self-checkout shopping in retail grocery stores, and is particularly directed to methods of mobile self-checkout shopping for produce items in a retail grocery store.

Figure 1:
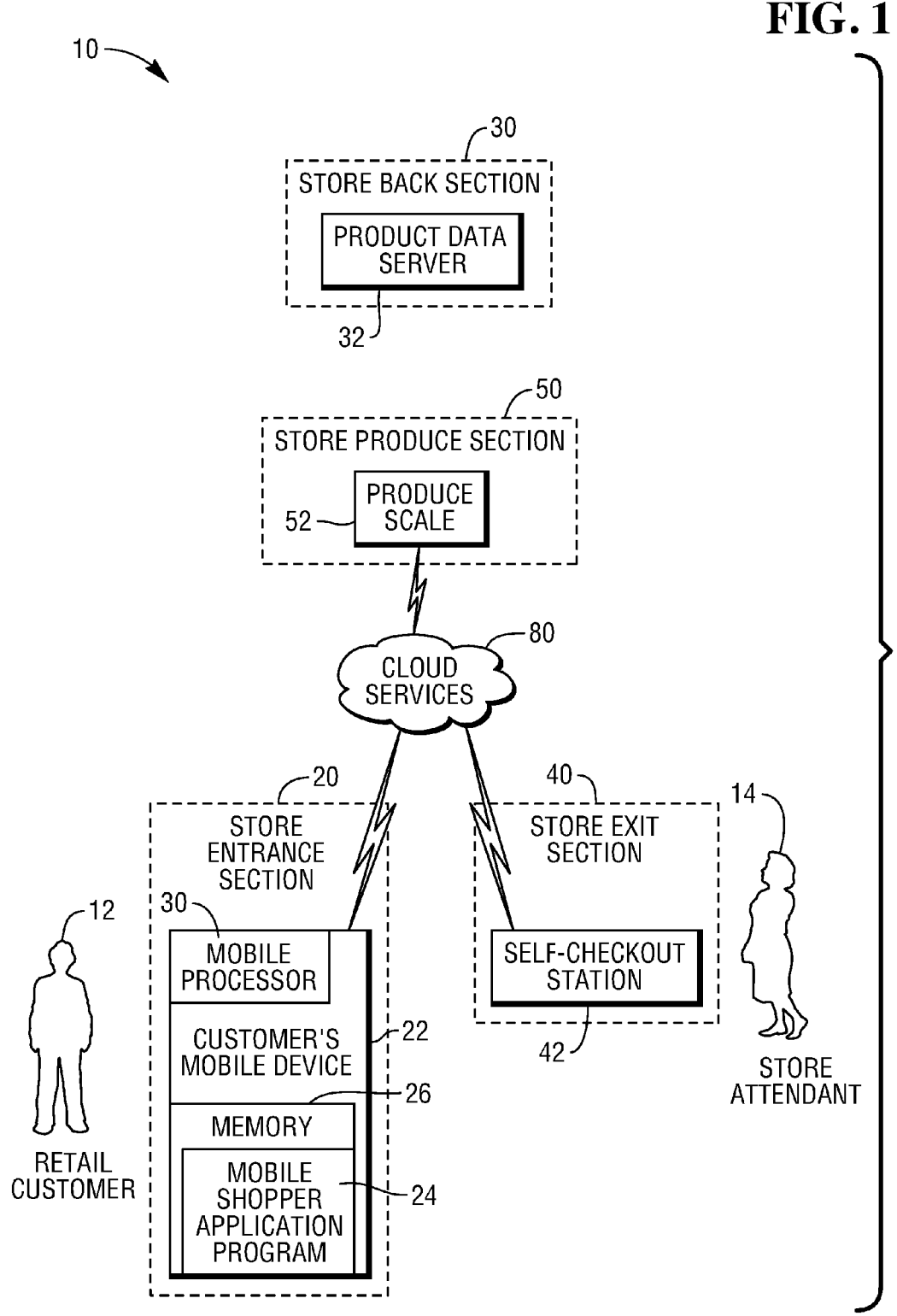
FIG. 1 is a system diagram illustrating various store components located in different sections of a retail grocery store.

Referring to FIG. 1, a system components diagram illustrates various store components located in different sections of retail grocery store 10. Retail grocery store 10 includes store entrance section 20 through which retail customers can enter retail grocery store 10. For simplicity, only one retail customer (designated with reference numeral "12") and one customer's mobile device (designated with reference numeral "22") are shown in FIG. 1. When retail customer 12 enters store entrance section 20 of retail grocery store 10, retail customer 12 prepares mobile device 22 and uses mobile device 22 to self scan barcoded items including barcoded produce items in retail grocery store 10.

Retail grocery store 10 further includes store back section 30 in which product data server 32 is located. Mobile device 22 and product data server 32 comprise a barcoding system in which barcode data of barcodes scanned by mobile device 22 can be wirelessly transmitted to product data server 32. Retail grocery store 10 also includes store exit section 40 in which self-checkout station 42 is located. Self-checkout pay station 42 may comprise any type of self-service terminal at which customer 12 can check out and pay for grocery items. A store attendant 14 is usually in the vicinity of self-checkout station 42 to assist customers as needed.

Figure 2:
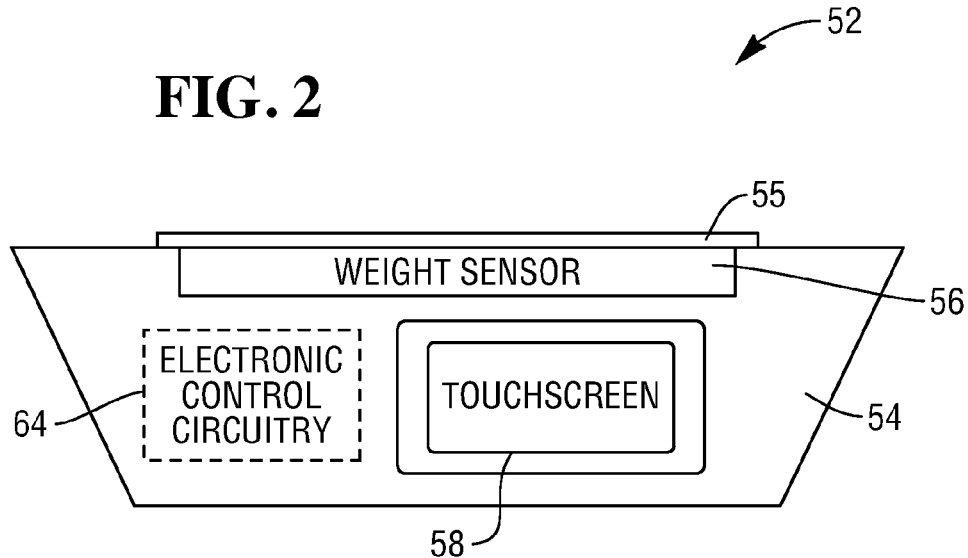
FIG. 2 is a somewhat schematic block diagram of a produce weighing scale which is used in the retail grocery store of FIG. 1.

Retail grocery store 10 further includes store produce section 50 in which produce weighing scale 52 is located. As shown in FIG. 2, produce weighing scale 52 includes base 54 over which a substantially planar-shaped weighing platform 55 is disposed. Weight sensor 56 is located beneath weighing platform 55. Weight sensor 56 provides an electrical output signal indicative of weight of a produce item which has been placed onto weighing platform 55, as is known. Touchscreen 58 acts as a user interface including a display and enables retail customer 12 to interact with produce weighing scale 52.

Figure 3:
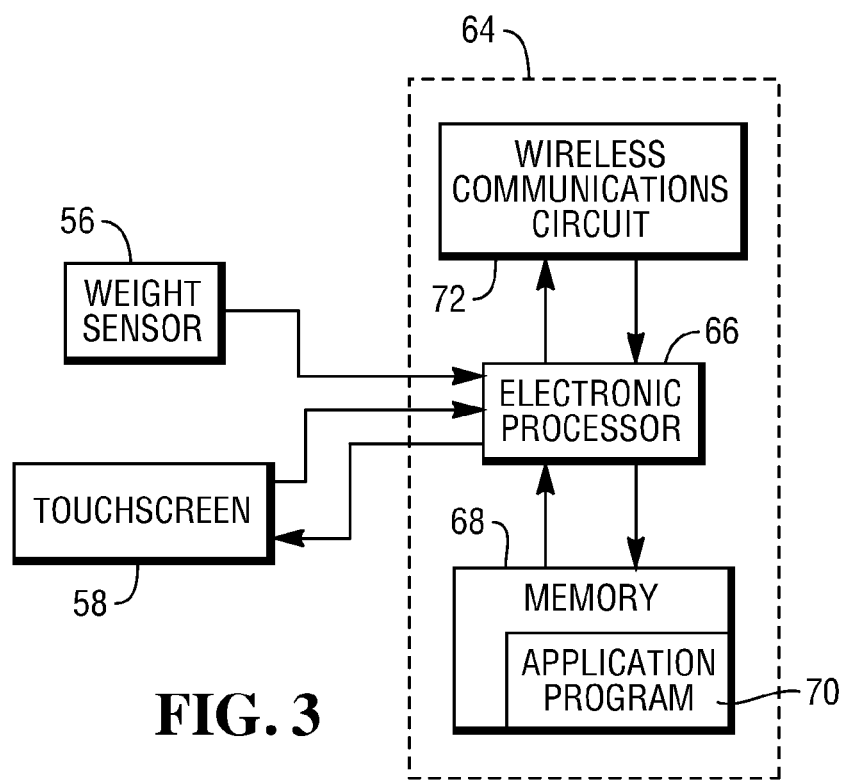
FIG. 3 is a schematic block diagram of electronic control circuitry which is used in the produce weighing scale of FIG. 2.

Referring to FIGS. 2 and 3, electronic control circuitry 64 is provided for controlling operation of produce weighing scale 52. Electronic control circuitry 64 may be disposed in an interior chamber of base 54 as shown in FIG. 2. As shown in FIG. 3, electronic control circuitry 64 includes an electronic processor 66, a memory 68 which stores instructions of an application program 70, and a wireless communications circuit 72. Application program 70 has one or more programs of instructions tangibly embodied in the program storage medium of memory 68.

Electronic processor 66 executes instructions of application program 70 to process a number of electrical input signals received from weight sensor 56, touchscreen 58, and wireless communications circuit 72. Electronic processor 66 then provides a number of electrical output signals to provide output display screens on touchscreen 58, and to control operation of the wireless communications circuit 72. Structure an operation of electronic processors, memories, weight sensors, touchscreens, and wireless communications circuits are known and, therefore, will not be described.

Referring back to FIG. 1, mobile device 22 may comprise any type of electronic device which can scan a barcode. For example, mobile device 22 may comprise a smartphone. Smartphones are commercially available from a number of different manufacturers. Structure and operation of smartphones are known and, therefore, will not be described.

A mobile shopper application program 24 is stored in memory 26 of mobile device 22 and is a software component running on mobile device 22. Mobile shopper application program 24 has one or more programs of instructions tangibly embodied in the program storage medium of memory 26. Mobile electronic processor 30 executes instructions of mobile shopping application program 24 to enable customer 12 of mobile device 22 to (i) scan produce items in aisles of store produce section 50 of retail grocery store 10, (ii) communicate with produce scale 52 located in store produce section 50, and (iii) communicate with self-checkout station 42 located in store exit section 40, as will be described in detail hereinbelow.

Mobile device 22 is connected to cloud services ("cloud") which is represented by cloud-shaped symbol 80 shown in FIG. 1. Cloud 80 links together mobile device 22, produce weighing scale 52, and self-checkout station 42. An electronic shopping cart resides in cloud 80. Software and operation of the software associated with electronic shopping carts are known and, therefore, will not be described.

Figure 4:
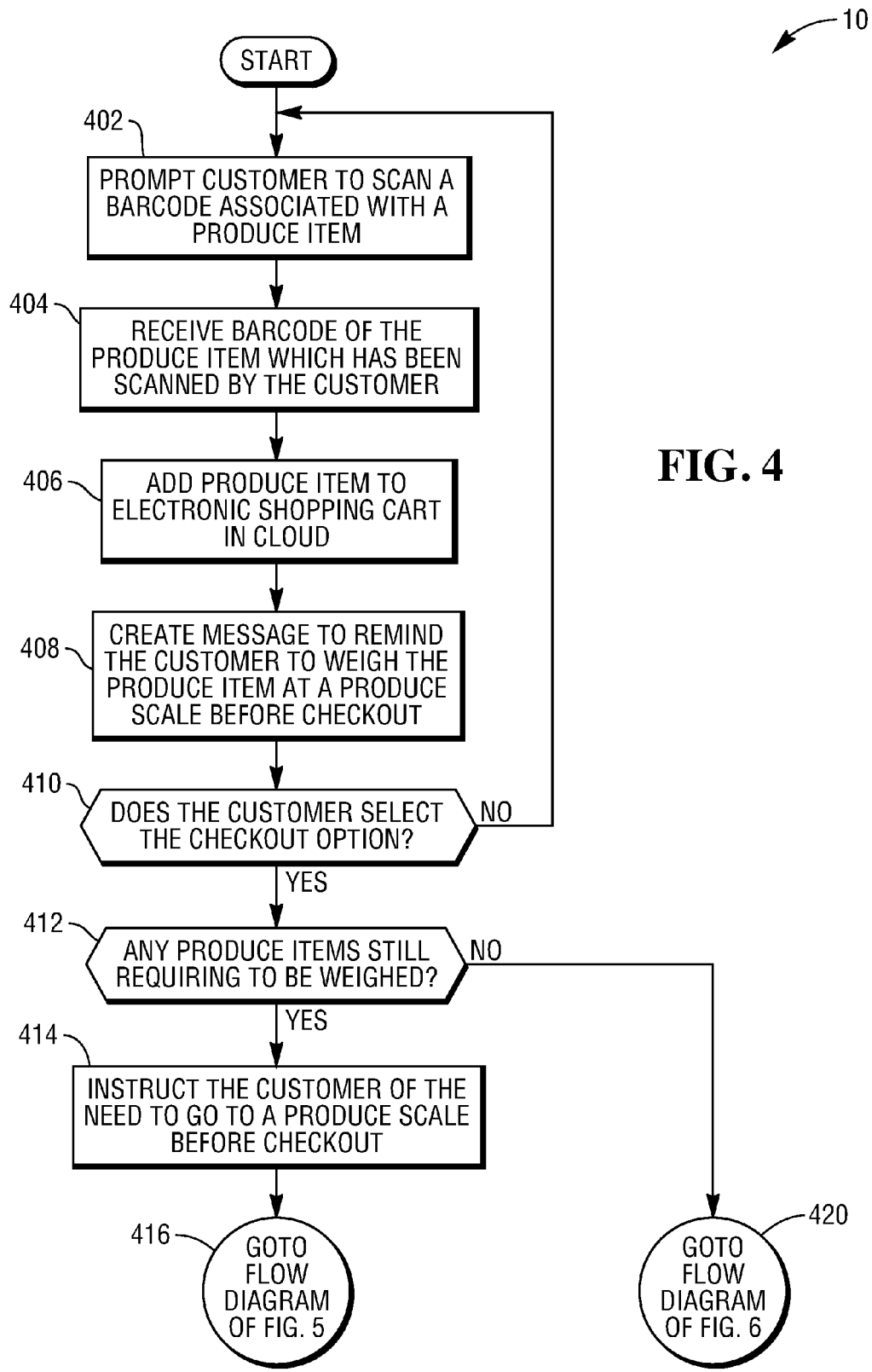
FIG. 4 is a flow diagram depicting operation of a customer's mobile device in a retail grocery store when purchasing produce items in accordance with an embodiment.

Referring to FIG. 4, flow diagram 400 depicts operation of customer's mobile device 22 when purchasing produce items in aisles of store produce section 50 (FIG. 1). As shown in step 402, mobile device 22 provides a prompt instruction on display of mobile device 22 to prompt the customer to scan a barcode from a produce tag associated with a produce item. The customer may be located in an aisle of store produce section 50, or may be located at produce scale 52 of store produce section 50. After customer 12 scans a barcode from a produce tag of a produce item in step 402, mobile device 22 receives barcode data which is representative of the barcode which has been scanned by customer 12 (step 404).

Mobile device 22 then adds the produce item which has just been scanned into the electronic shopping cart in cloud 80 (step 406). Mobile device 22 displays the cloud content. Mobile device 22 also creates a message which is used to remind the customer to weigh the produce item at a produce scale before going to checkout (step 408).

A determination is made in step 410 as to whether customer 12 selects a checkout option which appears on display (not shown) of mobile device 22. If determination in step 410 is negative (i.e., customer 12 has not selected the checkout option), the process returns back to step 402 to allow customer 12 to scan a barcode associated with another produce item. However if determination in step 410 is affirmative (i.e., customer 12 has selected the checkout option), the process proceeds to step 412.

A determination is then made in step 412 as to whether there are any produce items which still need to be weighed before proceeding to checkout. If determination in step 412 is affirmative (i.e., there is a produce item still required to be weighed), the process proceeds to step 414. In step 414, mobile device 22 displays an instruction for customer 12 to go to a produce scale before proceeding to checkout. For convenience for customers, produce weighing scales may be located in the vicinity of self-checkout station 42 at store exit section 40 of retail grocery store 10. As shown in step 416, the process then proceeds to flow diagram 500 of FIG. 5 which depicts operation of produce weighing scale 52 of FIG. 2 in accordance with an embodiment.

Alternatively, instead of produce weighing scales being located in vicinity of self-checkout station 42, it is conceivable that a produce weighing scale be embedded in self-checkout station 42. In this case, a process similar to the process of flow diagram 500 of FIG. 5 for the produce weighing scale 52 of FIG. 2 could be implemented for the embedded produce weighing scale.

However if determination in step 412 is negative (i.e., there are no other produce items which still need to be weighed), the process proceeds to step 418. In step 418, mobile device 22 transfers shopping information from the mobile device 22 to self-checkout station 42 (FIG. 1) when customer 12 arrives at self checkout station 42. As shown in step 420, the process then proceeds to flow diagram 600 of FIG. 5 which depicts operation of self-checkout station 42 in accordance with an embodiment.

Figure 5:
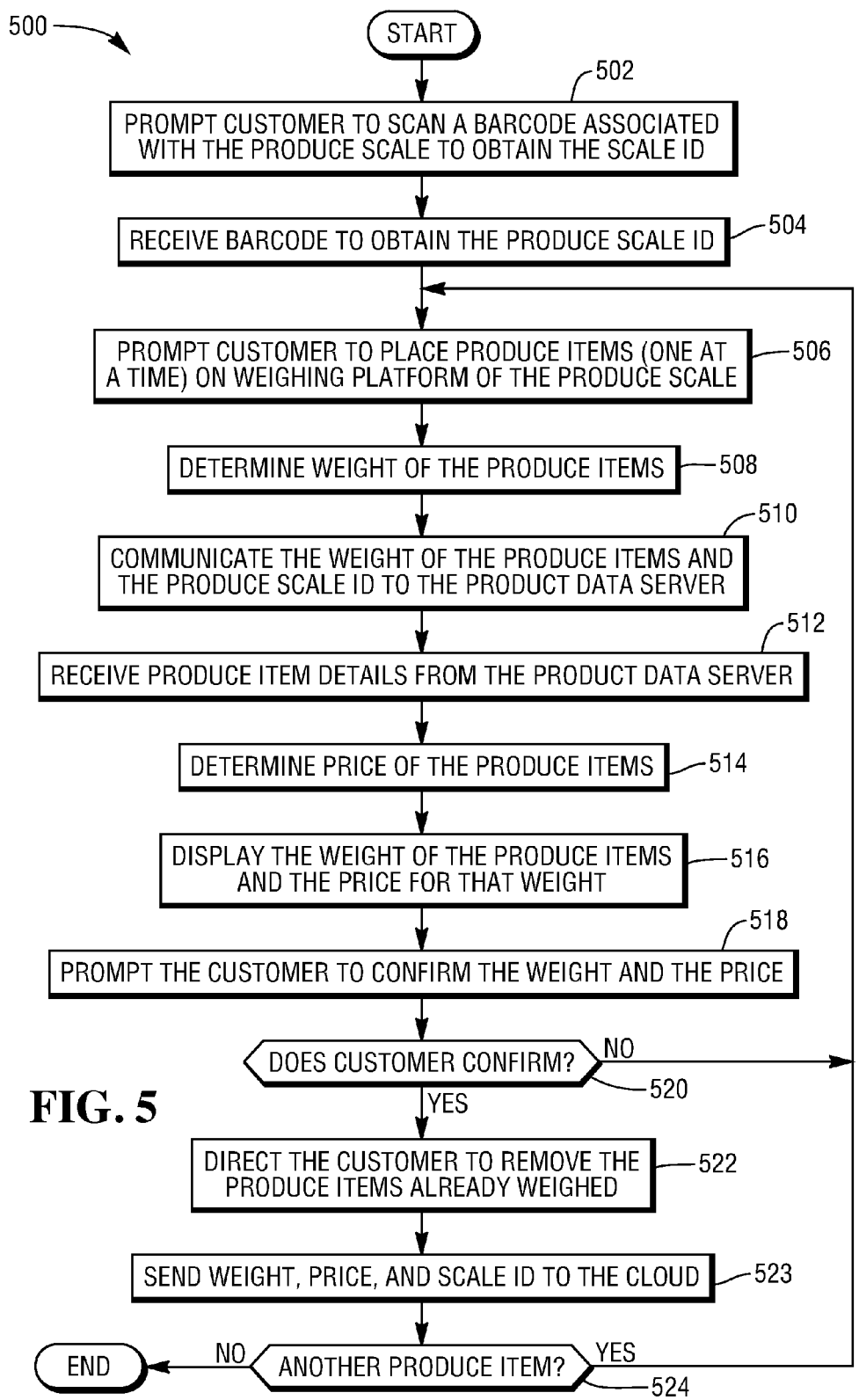
FIG. 5 is a flow diagram depicting operation of the produce weighing scale of FIG. 2 in accordance with an embodiment.

Referring to FIG. 5, flow diagram 500 depicts operation of produce weighing station 52 in accordance with an embodiment. As shown in step 502, produce scale 52 provides a prompt on touchscreen 58 of produce scale 52 to prompt customer 12 to scan a barcode associated with produce scale 52 and thereby to obtain produce scale identification (ID) associated with the particular produce scale 52. After customer 12 scans barcode associated with produce scale 52 to obtain the scale ID in step 502, produce scale 52 receives the barcode of produce scale 52 which has just been scanned by the customer 12 (step 504). Produce scale 52 then provides a prompt on touchscreen 58 of produce scale 52 to prompt the customer 12 to place produce items (one at a time) on weighing platform 55 (FIG. 2) of produce scale 52 (step 506).

After produce items have been placed on weighing platform 55 of produce scale 52 in step 506, a determination is made of the weight of the produce items which have just been placed thereon (step 508). In step 510, weight of produce items determined in step 508 and the produce scale ID received in step 504 are then communicated to product data server 32 (FIG. 1) located in store back section 30. Product scale 52 then receives produce item details from product data server 32 in response to the communication of step 510 (step 512).

In step 514, a determination is made of the price of the produce items which are on weighing platform 55 based upon the produce item details received from product data server 32 in step 512. The price may be determined by multiplying the weight of the produce item (as indicated by an electrical output signal from the weight sensor 56) with a price/unit-of-weight value which is associated with the particular produce item. The price/unit-of-weight value may be stored in the memory 68. Immediately after the produce item has been placed on weighing platform 55, electronic processor 66 takes a relatively short amount of time (typically only a fraction of seconds) to determine both weight of the produce item and price of the produce item. Weight of the produce items and price of the produce items for that weight are then displayed on touchscreen 58 of produce scale 52 (step 516).

Produce scale 52 provides a prompt on touchscreen 58 of produce scale 52 to prompt the customer 12 to confirm that the weight and the price for that weight of produce items are correct (step 518). A determination is made in step 520 as to whether customer 12 confirms that weight and price of the produce items on weighing platform 55 of produce scale 52 are correct. If determination in step 520 is negative (i.e., the customer 12 does not confirm rectus of weight and price of produce items), the process returns back to step 506 to prompt the customer 12 to place produce items again (one at a time) on weighing platform 55 of produce scale 52. However, if determination in step 520 is affirmative (i.e., the customer 12 confirms correctness of weight and price of produce items), the process proceeds to step 522.

In step 522, produce scale 52 provides instruction on touchscreen 58 to direct customer 12 to remove the produce items already weighed from weighing platform 55. Customer 12 then places the removed produce items into the physical shopping cart. In step 523, produce scale 52 sends weight of the produce items, price of the produce items, and the produce scale ID to cloud 80 to update the electronic shopping cart. A determination is made in step 524 as to whether there is another produce item to be weighed by produce scale 52. If determination in step 524 is affirmative (i.e., there is another produce item to be placed on weighing platform 55 of produce scale 52), the process proceeds back to step 504 to repeat the process described hereinabove for the produce items which have just been weighed and priced. However, if determination in step 524 is negative (i.e., there is no other produce item to be weighed on produce scale 52), the process ends.

Figure 6:
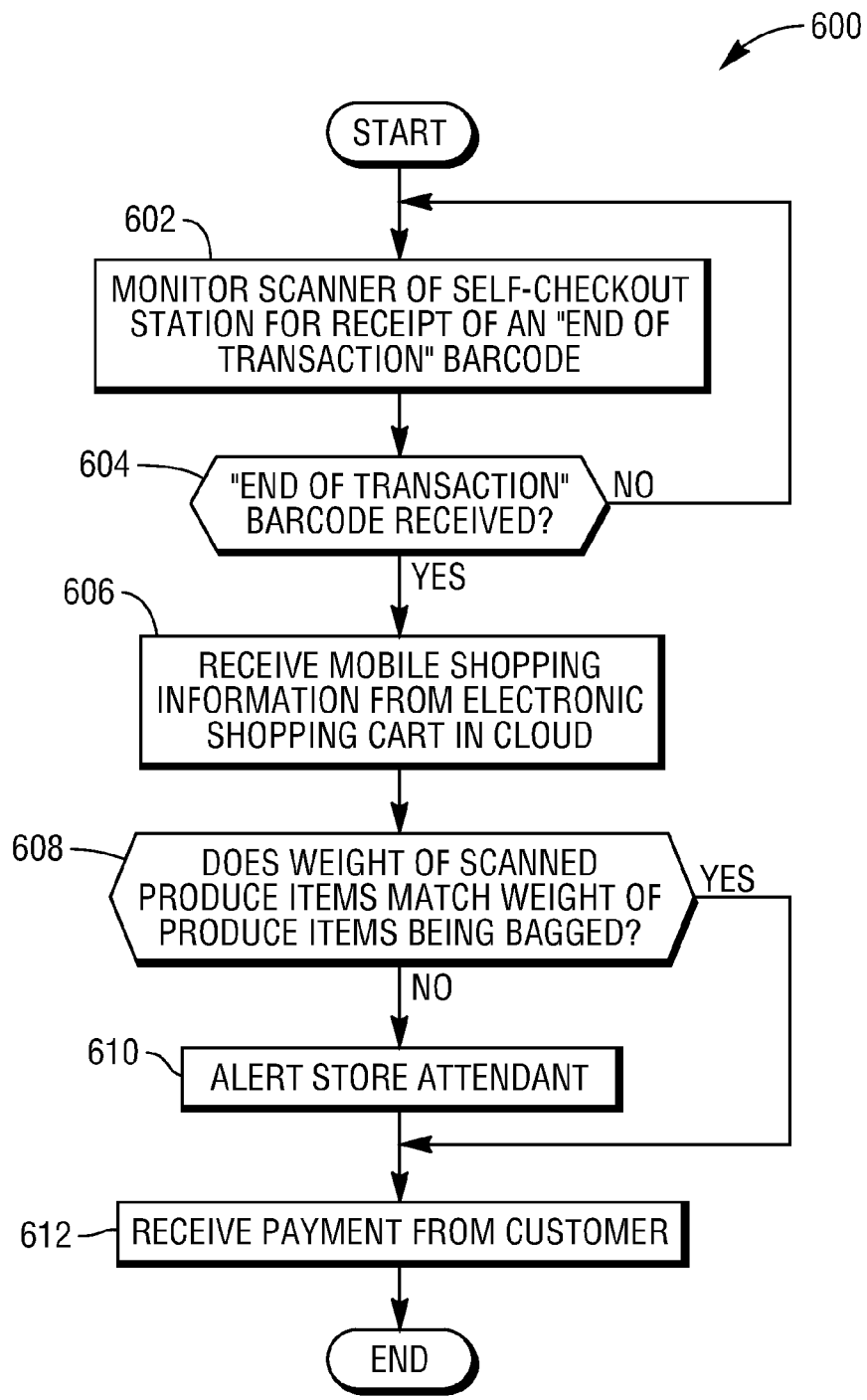
FIG. 6 is a flow diagram depicting operation of a self-checkout station when a customer is checking out and making payment for purchase of grocery items at the self-checkout station in accordance with an embodiment.

Referring to FIG. 6, flow diagram 600 depicts operation of self-checkout station 42 (FIG. 1) when customer 12 uses mobile device 22 to interact with self-checkout station 42 to checkout and make payment for purchase of grocery items including produce items. Any type of self-checkout station may be used. As an example, a full-featured type of self-checkout station may be used. Such a full-featured self-checkout station may comprise a number of scanners, a number of scales, and a bagging area. As another example, a bare-minimum type of self-checkout station may be used. Such a bare-minimum self-checkout station may comprise only a payment terminal with no scanners, no scales, and no bagging area.

As shown in step 602, an electronic processor (not shown) of self-checkout station 42 monitors a scanner (also not shown) of self-checkout station 42 for receipt of an "end of transaction" signal from customer 12 at self-checkout station 42 scanning a barcode which is representative of the "end of transaction" signal. There are a number of ways that an "end of transaction" barcode can be provided to self-checkout station 42. As an example, an "end of transaction" barcode may be adhesively attached to mobile device 22 which customer 12 is using. As another example, an "end of transaction" barcode may be supplied by store attendant 14 (FIG. 1) when customer 12 arrives at self-checkout station 42. Still as another example, customer 12 may scan a quick response code ("QR code") associated with self-checkout station 42. The scanning of an "end of transaction" barcode by customer 12 signals self-checkout station 42 that customer 12 is ready to checkout at the particular self-checkout station.

A determination is then made in step 604 as to whether an "end of transaction" barcode has been scanned by customer 12 at self-checkout station 42. If determination in step 604 is negative (i.e., no "end of transaction" barcode has been received), the process proceeds back to step 602 to continue monitoring for an "end of transaction" barcode. However, if determination in step 604 is affirmative (i.e., an "end of transaction" barcode has been scanned and received), the process proceeds to step 606.

In step 606, mobile shopping information is received from the electronic shopping cart in cloud 80. The mobile shopping information includes weights, prices, and/or other details of produce items which have been placed into the electronic shopping cart in cloud 80. The mobile shopping information may also include weights, prices, and/or other details of non-produce items which have been placed into the electronic shopping cart in cloud 80.

A determination is made in step 608 as to whether the weight of scanned produce items which have been scanned at produce scale 52 matches the weight of produce items which are being bagged at self-checkout station 42. If determination in step 608 is negative (i.e., the weights do not match), the process proceeds to step 610 in which store attendant 14 (FIG. 1) is alerted and notified of the weights not matching within a predetermined tolerance range. Store attendant 14 takes actions as necessary to resolve the discrepancy of weights of produce items determined back in step 608 and to answer any questions customer 12 may have. As an example, store attendant 14 may perform a visual inspection and override the discrepancy by accepting a weight which is outside of a tolerance range of weight values which are between a predetermined lower weight value and a predetermined higher weight value. The process then proceeds to step 612. However, if determination in step 608 is negative (i.e., the weights do match), the process proceeds directly to step 612.

In step 612, self-checkout station 42 receives payment from customer 12 for purchasing grocery items including the produce items described hereinabove. Payment may be effected at self-checkout station 42 using either cash or a payment card in known manner. After making payment, customer 12 can leave retail grocery store 10.

Although the above description of flow diagram 600 of FIG. 6 describes use of a static barcode, it is conceivable that a dynamic barcode appearing in a display of self-checkout station 42 be used instead. In this case, after customer 12 scans the dynamic barcode, mobile device 22 extracts an ID of the self-checkout station 42 and an ID of the transaction and sends a transaction transfer request to the cloud 80. The cloud 80 in turn sends the self-checkout station 42 a mobile transaction signal including the electronic shopping cart details for processing.

It should be apparent that co-operation of produce scale 52 and mobile device 22 described hereinabove requires no barcode chit to be printed on paper. Customer 12 simply uses mobile device 22 and scans a barcode chit directly from the produce item to be purchased. Since produce scale 52 needs no paper, there is no paper costs associated with operation thereof. The result is lower operation costs and lower maintenance costs for retail grocery store 10.

It should also be apparent that mobile shopping application 24 on mobile device 22 and enables customer 12 to save time and to make shopping faster, easier, and more convenient by using customer's own mobile device 22, such as a smartphone, to scan grocery items including produce items in the aisles of retail grocery store 10 as the customer 12 shops. Moreover, it is conceivable that customer 12 can use mobile shopping application program 24 to create virtual shopping lists before going to retail grocery store 10. This further increases speed, efficiency, and ease of customer's shopping trip to retail grocery store 10.

It should be further apparent that co-operation of produce scale 52 and mobile device 22 described hereinabove allows customer 12 to purchase a produce item without any assistance from a store clerk. A store clerk is not responsible for weighing a produce item desired to be purchased by customer 12. Customer 12 is able to use mobile device 22 to ring up all items including produce items, and then to make payment at self-checkout station 42 without having to handle produce items in a different way from non-produce items. Moreover, if self-checkout station 42 has a feature which determines a gross weight of all grocery items (i.e., both produce items and non-produce items) contained in the entire physical shopping cart, it is conceivable that customer 12 may not need to weigh produce items at checkout, and therefore may not need to remove grocery items from the physical shopping cart. The result is an uninterrupted flow of a self scanning transaction of all items (i.e., both produce items and non-produce items) using mobile device 22.

It should also be apparent that the customer 12 is able to see the price of produce item before checkout. This feature is beneficial over known store systems in which produce items are weighed on a produce scale which is located at a self-checkout station. In these known store systems, a customer may not see the price of a produce item until the customer checks out at the self-checkout station.

It should further be apparent that the above description describes a controlled method to assist customer 12 who is carrying mobile device 22 to shop for produce items in the aisles of produce section 50 of retail grocery store 10 in a manner unknown before. The customer assist method is automatic in that the method is performed without human intervention from a store clerk or attendant.

Although the above description describes communications circuit 72 of produce weighing scale 52 as being wireless and communications circuit 278 of mobile device 22 as being wireless, it is conceivable that the produce scale 52 could be enabled for near frequency communication (NFC) or radio frequency communication (RFC). Produce scale 52 would be able to transfer the scale ID (or even receive produce item and shopping cart information) by tapping the customer's mobile device 22.

Also, although the above description describes customer 12 scanning a barcode from a produce tag of a produce item, it is conceivable that customer 12 may scan a barcode displayed in a programmable electronic shelf label device which is associated with a particular produce item.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method of operating a produce weighing scale having a weighing platform, the method comprising:
   prompting, by the produce weighing scale, a customer to scan a barcode containing barcode data which identifies the produce weighing scale;
   receiving, by the produce weighing scale, the barcode data which identifies the produce weighing scale; and
   after the barcode data has been received, prompting, by the produce weighing scale, the customer to place produce items one-by-one onto the weighing platform of the produce weighing scale.

2. A method according to claim 1, further comprising determining weight of the produce items on the weighing platform of the produce weighing scale.

3. A method according to claim 2, further comprising (i) communicating the weight of the produce items and a produce scale ID to a product data server, and (ii) receiving produce item details from the product data server based upon the weight of the abuse items and the produce scale ID communicated to the product data server.

4. A method according to claim 3, further comprising determining price of the produce items based upon the produce item details received from the product data server.

5. A method according to claim 4, further comprising displaying the weight of the produce items and the price of the produce items for that weight.

6. A method according to claim 5, further comprising directing the customer to remove the produce items which have been weighed on the weighing platform of the produce weighing scale.

7. A method according to claim 1, wherein the method is performed by a computer having a memory executing one or more programs of instructions which are tangibly embodied in a program storage medium readable by the computer.

* * * * *